United States Patent [19]

Nankee, II et al.

[11] Patent Number: 5,255,661
[45] Date of Patent: Oct. 26, 1993

[54] METHOD FOR DETERMINING FUEL COMPOSITION USING OXYGEN SENSOR FEEDBACK CONTROL

[75] Inventors: Robert J. Nankee, II, Canton; John E. Letcher, Chelsea, both of Mich.

[73] Assignee: Chrysler Corporation, Highland Park, Mich.

[21] Appl. No.: 933,551

[22] Filed: Aug. 24, 1992

[51] Int. Cl.$^5$ .............................................. F02M 7/00
[52] U.S. Cl. ..................................... 123/674; 123/672
[58] Field of Search ................ 123/672, 674, 117, 494

[56] References Cited

U.S. PATENT DOCUMENTS

| | | | |
|---|---|---|---|
| 4,706,629 | 11/1987 | Wineland et al. | 123/1 A |
| 4,706,630 | 11/1987 | Wineland et al. | 123/1 A |
| 4,770,129 | 9/1988 | Uriyata et al. | 123/494 |
| 4,989,570 | 2/1991 | Kuribara et al. | 123/117 |
| 5,163,407 | 11/1992 | Yoshida et al. | 123/672 |

Primary Examiner—Raymond A. Nelli
Attorney, Agent, or Firm—Mark P. Calcaterra

[57] ABSTRACT

A flexible fuel vehicle is a vehicle capable of operating on alcohol, gasoline, or any combination of these two fuels. Because of the unique properties of alcohol fuels, modifications to engine operating characteristics are required to compensate for the varying percentage of alcohol in the fuel. A method is provided for determining the percent alcohol content of the fuel in the fuel tank, utilizing the oxygen sensor feedback control loop to sense changes in air/fuel ratio and relay that information to the engine controller so that dependant variables can be adjusted accordingly. The method includes placing the fuel pump in the fuel tank along with a mixed fuel accumulator so that a known and slowly varying percentage of alcohol in the fuel is provided to the engine, especially during open loop operation.

15 Claims, 2 Drawing Sheets

METHOD FOR DETERMINING FUEL COMPOSITION USING OXYGEN SENSOR FEEDBACK CONTROL

BACKGROUND OF THE INVENTION

1. Field Of The Invention

The present invention relates generally to fuel composition for a motor vehicle, and more particularly to a method and apparatus for determining the percent alcohol content of a fuel used in a motor vehicle capable of operating on more than one type of fuel.

2. Description Of The Related Art

Environmental and energy independence concerns have stimulated the development of alternative transportation fuels, such as alcohol-based fuels, for use in automobiles. Alcohol fuels include methanol and ethanol. A flexible fuel vehicle capable of operating on gasoline, or alcohol fuel, or any mixture of the two fuels, is one design that meets this demand. Modifications to the engine are necessary when operating on different fuels, because of the different characteristics of each fuel. For example, an engine operating on methanol or M85 (a blend of 85% methanol and 15% gasoline) requires approximately 1.8 times the amount of fuel relative to gasoline at stoichiometry due to a lower energy content of the methanol.

One means for identifying the ratio of gasoline to alcohol fuel present in the fuel tank is to use a fuel composition sensor. The fuel composition sensor may be located in or near the fuel tank, and its function is to determine the percentage of alcohol in a gasoline/alcohol fuel mixture.

For example, commonly assigned U.S. Pat. No. 5,119,671 hereby expressly incorporated by reference, discloses a fuel composition sensor that measures the percent alcohol content of the fuel and relays that information to an engine controller or the like so that dependant variables such as spark timing and air/fuel ratio can be adjusted accordingly.

Commonly assigned application, U.S. Ser. No. unknown, filed on the same day as the subject application and entitled "Method For Determining Fuel Composition", provides a method for determining the percent alcohol content of the fuel when the fuel composition sensor is not functioning properly, by utilizing the oxygen sensor feedback loop to identify changes in air/fuel ratio due to a changing fuel mixture.

In a typical automotive vehicle, a microprocessor, contained in an engine control unit (ECU), receives inputs from a number of sensors, processes the information from the sensors, and sends out instructions to selectively adjust various parameters. The process may be open loop or closed loop. The ECU stores the information it receives in two types of memory, erasable read only memory (ROM) and non-erasable random access memory (RAM).

The engine initially operates open loop until the engine attains a certain operating temperature, and then closed loop. A closed loop strategy can be described as an iterative process whereby the system output is also a factor of the input for next iteration. First, the parameters to be controlled are initialized to predetermined values and inputs are received based on current conditions; secondly, the information is processed; and finally, an output is produced. The output information then is available as an input parameter for the next iteration. This adjustment sequence is commonly called a feedback loop, whereby a system is able to learn about the environment it is operating within and make necessary adjustments.

An open loop strategy is similar to a closed loop system, except that the feedback loop is eliminated. In a vehicle it is generally used from the time the engine is cold-started until the engine has warmed up.

Similarly, adaptive memories are closed loop systems widely known in the automotive industry. Adaptive memories are initialized in RAM memory with a preset value regarding some parameter of the control system. These stored parameters are then continuously updated and adjusted as engine operating conditions change, and can be "looked up" and used by the engine controller when similar conditions are encountered.

Air/fuel ratio in internal combustion engine design is typically considered to be the ratio of mass flow rate of air to mass flow rate of fuel inducted by an internal combustion engine to achieve conversion of the fuel into completely oxidized products. The chemically correct ratio corresponding to complete oxidization of the products is called stoichiometric. If the air/fuel ratio is less than stoichiometric, an engine is said to be operating rich, i.e. too much fuel is being burned in proportion to the amount of air to achieve perfect combustion. Likewise, if the air/fuel ratio is greater than stoichiometric, an engine is said to be operating lean, i.e. too much air is being burned in proportion to the amount of fuel to achieve perfect combustion. Alcohol fuels have a higher or leaner air/fuel ratio than gasoline at stoichiometric, so that the engine must be compensated for in the rich direction a the percentage of alcohol in the fuel increases.

The oxygen sensor is located in the exhaust system and detects the amount of oxygen contained in the exhaust products leaving the engine through the exhaust system. The oxygen sensor then generates an input signal to the ECU based on the measured air/fuel ratio. The ECU processes the various input signals and its output signal varies the fuel injector's pulsewidth to adjust the fuel flow rate in an amount necessary to achieve the desired air/fuel ratio.

Under normal operating conditions, fuel vapors will collect inside the fuel tank. These vapors are temporarily stored inside vapor storage canisters containing activated charcoal, typically called purge canisters. Because of the limited storage capacity of the purge canister, it is periodically necessary to draw fresh air through the canister to remove the fuel vapor to the engine where it is burned. The purge solenoid utilizes input from the ECU to control the purge of vapors from the canister. An example is shown in U.S. Pat. No. 4,821,701, "Purge Corruption Detection", which is hereby expressly incorporated by reference.

SUMMARY OF THE INVENTION

The reliability of the fuel composition sensor is critical to vehicle performance, function, and customer satisfaction. The present invention eliminates the fuel composition sensor and relies on the oxygen sensor feedback control loop to identify changes in air/fuel control due to a changing mixture of fuel.

The present invention provides a method and apparatus for identifying the percentage of alcohol in a mixture of fuel and for adjusting the fuel delivery accordingly. Typically, the fuel pressure regulator is in-line with the fuel rail. In the preferred embodiment, the regulator is placed within the fuel tank. Fuel pressure can now be regulated at the fuel tank and pressurized fuel enters a fuel accumulator, which is also located within the fuel tank. The purpose of the accumulator is to store a composition of fuel that is known to the ECU, and to provide for a slow rate of change in the percentage of alcohol in the fuel leaving the accumulator and delivered to the fuel injectors. It is especially important during open loop operation to avoid radical shifts in fuel composition, in the absence of feedback control to compensate engine parameters.

During vehicle operation, the oxygen sensor feedback loop is used to identify changes in air/fuel control due to the changing percentage of alcohol present in the fuel. This is accomplished by determining whether an oxygen factor stored in the ECU is within a coarse predetermined range. If the oxygen factor is outside the coarse range, the purge solenoid is turned off as a test to determine if the oxygen factor returns to a fine predetermined range. If the oxygen factor does return, then purge is resumed and the purge multiplier stored in the ECU is checked and updated to ensure the oxygen factor returns to within the fine range. If the oxygen factor does not return, then the fuel composition multiplier stored in the ECU is updated until the oxygen factor returns to within the fine range. The values contained in adaptive memory, the fuel composition multiplier, and purge multiplier are then retained in the RAM memory section of the ECU until the next engine start, for use during open loop operation.

One advantage of the present invention is that it eliminates the need for a fuel composition sensor. Another benefit is that placing the pressure regulator in the fuel tank eliminates the fuel return line connected between the fuel rail and the fuel tank to return excess fuel to the fuel tank. This also results in lower fuel tank temperatures. A further advantage is that a known composition of fuel is delivered to the fuel injector when the engine is operating open loop. Also, large shifts in percentage of alcohol content of the fuel will not be delivered to the fuel injector, which responds more accurately to slowly varying percentages of alcohol in the fuel.

An object of the invention is to provide a method to determine the percentage of alcohol fuel in a mixture of gasoline and alcohol fuel.

It is still another object of the invention to use the oxygen sensor feedback loop to identify changes in air/fuel control due to a varying percentage of alcohol in the fuel.

It is yet another object of the invention to store a known composition of fuel within a canister in the fuel tank while the engine is operating open loop.

It is a further object of the invention to provide a slowly changing percentage of fuel mixture to the fuel injector.

Other objects, features and advantages of the present invention will become more fully apparent from the following description, in light of the accompanying drawings.

DESCRIPTION OF THE PREFERRED EMBODIMENT

Figure 1:
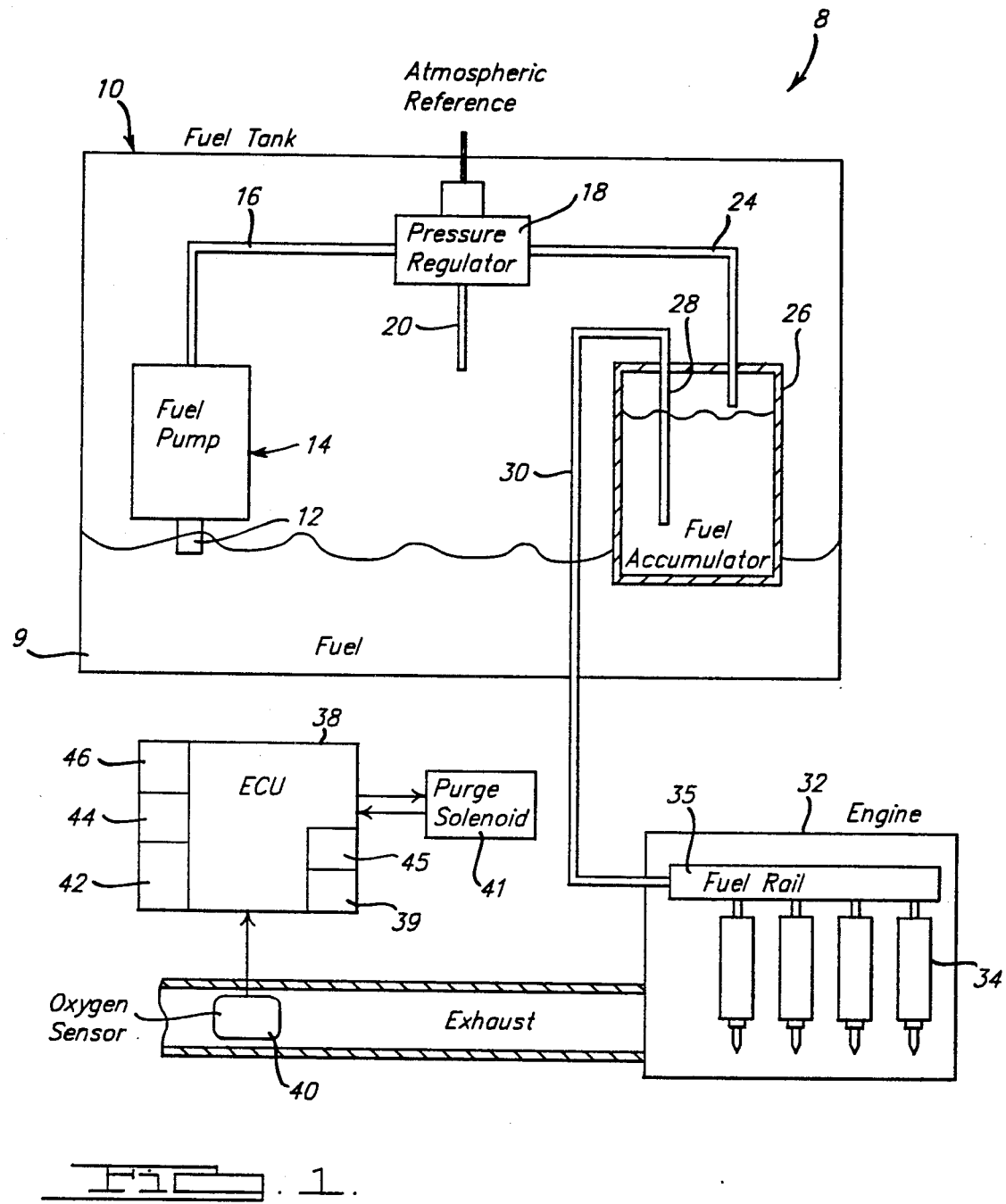
FIG. 1 is a functional block diagram of the fuel system and related control apparatus for identifying the composition of the fuel.

Referring to FIG. 1, a fuel system 8 intended for a motor vehicle is shown. The system 8 includes a tank 10 for holding a fuel 9. The fuel 9 is gasoline or methanol or any combination of the two fuels. Ethanol may also be used in any combination with gasoline. The size and shape of tank 10 is primarily a function of the amount of available space. A means for pumping fuel may include a fuel pump 14, fuel intake or fuel pick-up 12 and a pressure regulator 18. A fuel pump 14 is disposed within tank 10 for pumping pressurized fuel 9 from the tank 10 to a means for injecting fuel such as a plurality of fuel injectors 34. Fuel 9 enters the fuel pump 14 through a fuel pickup 12 in communication with said fuel pump 14. The fuel pickup 12 is composed of a nylon mesh sock for receiving fuel 9 and filtering out harmful particles. The now pressurized fuel 9 exits the pump 14 through a first line 16 connected at one end to pump 14 and at a second end to a fuel pressure regulator 18 also located within the tank 10.

Regulator 18 measures the rate of flow of fuel 9 and compares it to a preset reference pressure. If the actual fuel pressure exceeds the reference pressure, fuel 9 is released through a fuel return line 20 that is connected at one end to the regulator 18 and open at a second end to allow the excess fuel 9 to drain back into the tank 10. The fuel 9 then exits the regulator 18 through a second line 24 connected at a first end to the regulator 18 and at a second end to a means for storing fuel 9 in a mixed state such as a fuel accumulator 26 so that the fuel 9 is deposited in the accumulator 26. The accumulator 26 may also be located within the tank 10.

The accumulator 26 initially contains a composition of fuel 9 that is known to the ECU 38, since the previous value of percent alcohol content of the fuel is stored in the ECU 38. The greater amount of fuel 9 the accumulator 26 is able to contain, the more slowly the fuel 9 entering the accumulator 26 is mixed with the old fuel 9 contained in the accumulator 26, and the more gradual the rate of change of percentage alcohol in the fuel reaching the engine 32.

The size of the accumulator 26 is one gallon, but it could be larger or smaller depending on how much time the vehicle spends in open loop control. The shape of the accumulator 26 is generally a closed cylinder; however, the shape will depend on the available space and configuration of the tank 10. It is desirable that the fuel 9 remain in a mixed state, which may be accomplished by several mixing means including, but not by way of limitation, baffles, the movement of the vehicle or reliance on the different densities of the potential fuels 9.

A tube 28 is disposed within the accumulator 26, running parallel to a side wall and extending almost to the bottom of the accumulator 26. The lower end of tube 28 is open so that fuel 9 in a mixed state can enter the lower end of tube 28 and be pumped through the tube 28 out of the accumulator 26 and into a fuel line 30 connected at one end to the upper end of the tube 28.

The opposite end of fuel line 30 is connected to a fuel rail 35. The fuel rail 35 is a means for distributing fuel 9 to the individual fuel injectors 34. The fuel 9 then passes through fuel line 30, is distributed through fuel rail 35 and into the fuel injectors 34, where it is injected into the engine manifold (not shown) and mixed with air to begin the combustion process.

Figure 2:
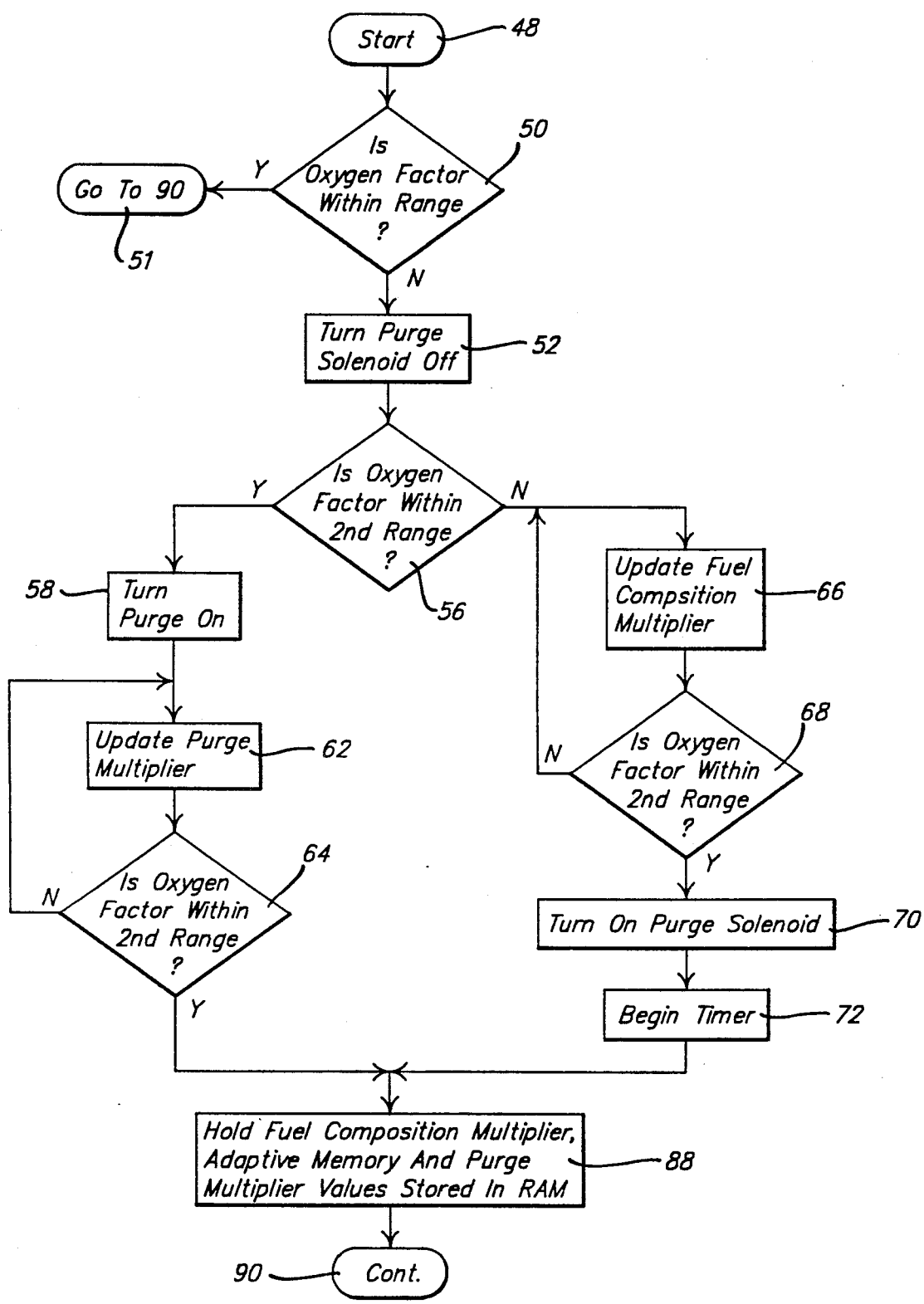
FIG. 2 is a flow chart of the methodology for identifying the composition of fuel.

Referring to FIG. 2, a method is shown for using the oxygen sensor feedback loop, including the oxygen sensor 40 and ECU 38, to identify changes in air/fuel control due to varying percentage of alcohol in the fuel 9. The ECU 38 has many functions, including storing and processing of information. The ECU 38 stores information in two types of memory, read only memory (ROM) 50 or erasable memory; and random access memory (RAM) 48 or non-erasable memory.

The method begins in block 48 and continues to block 50. In block 50 an oxygen factor 39 stored in the ECU 38 is checked to determine whether it is within a coarse known range, such as ±9% of a predetermined value. If the oxygen factor 39 is within a coarse range, the method branches to block 90. The oxygen factor 39 is calculated by the ECU 38 based on inputs from the oxygen sensor 40, and is used to adjust the pulsewidth signal controlling the amount of fuel 9 delivered to the fuel injectors 34 to be injected into an engine 32.

If the oxygen factor 39 is outside the course range, the method branches to block 52. In block 52 a purge test is conducted whereby the purge solenoid 41 is shut off. In block 56, after a predetermined period of time such as 3 seconds, the oxygen factor 39 is checked to determine whether it is within a fine predetermined range, such as ±5% of a predetermined value.

If the oxygen factor 39 is within the fine range, the method branches to block 58, where purge is updated by turning a purge solenoid 41 on. The method proceeds to block 62, where after a period of time such as 3 seconds, a purge multiplier 42 stored in the ECU 38 is updated. The purge multiplier 42 is an adjustment factor related to the amount of purge vapors released. In block 64, the oxygen factor 39 is again checked to determine whether it is still within the fine range. If the oxygen factor 39 is outside the fine range, the method branches to block 62 where the purge multiplier 42 is updated again. If the oxygen factor 39 is now within the fine range, the method branches to block 88.

Returning to block 56, if the oxygen factor 39 is outside a fine range, the method branches to block 66 where a fuel composition multiplier 44 stored in the ECU 38 is updated. The fuel composition multiplier 44 contains a value representing the percent alcohol content of the fuel 9. In block 68 the oxygen factor 39 is checked whether it is within the fine, predetermined range. If the oxygen factor 39 is outside the fine range, the method branches to block 66, where the fuel composition multiplier 44 is updated further. Returning to block 68, if the oxygen factor 39 is within the fine range, the method branches to block 70, where the purge solenoid 41 is turned on. In block 72 a timer 45 located within the ECU is started. The method branches to block 88.

In block 88, the updated values contained in adaptive memory 46, the purge multiplier 42 and fuel composition multiplier 44 are stored in the RAM memory section 48 within the ECU 38 for use during the next key-on. The method branches to block 90 where the method ends and control is returned to the ECU 38.

It should be understood that while this invention has been discussed in connection with one particular example, those skilled in the art will appreciate that other modifications can be made without departing from the spirit of this invention after studying the specification, drawings, and the following claims.

We claim:

1. In a motor vehicle having an internal combustion engine with a throttle means; a fuel control system comprising a fuel tank for holding a fuel that may be gasoline or an alcohol, a fuel accumulator disposed within the fuel tank for receiving and storing fuel from the fuel tank, and a fuel rail and fuel injectors; the fuel control system working in conjunction with an engine control unit (ECU) including a non-erasable memory, microprocessing unit, an input/output (I/O) module and an adaptive memory feature; evaporative emission controls (purge system) including a purge solenoid; an oxygen sensor having an input and an output; a method for determining a value of percent alcohol content of a fuel for selectively controlling combustion parameters of an internal combustion engine, the method comprising:

regulating the pressure of the fuel entering the fuel accumulator;

maintaining the fuel within the fuel accumulator in a mixed state;

delivering a slowly changing composition of fuel from the fuel accumulator to the fuel injector; and adjusting the amount of fuel supplied to the fuel injector based on changes in air/fuel ratio due to changing fuel composition.

2. The method of claim 1, wherein the step of regulating the pressure of fuel entering the fuel accumulator includes:

pumping fuel within said tank therethrough a fuel pickup in communication with said fuel pump and pressurized fuel out of said fuel pump through a first line having a hollow interior connected between said fuel pump and a fuel pressure regulator;

checking pressure of said fuel with said fuel pressure regulator and draining said fuel through a fuel return line having a hollow interior and connected to said fuel pressure regulator at a first end and open at a second end, if the pressure exceeds a reference pressure; and flowing fuel therethrough a second line having a hollow interior disposed between said fuel pressure regulator at one end and a fuel accumulator at a second end.

3. The method of claim 2, wherein the step of maintaining said composition of fuel within said fuel accumulator in a mixed state includes:

depositing fuel through said second line into an upper section of said fuel accumulator; and withdrawing fuel from a lower section of said fuel accumulator through a tube having a hollow interior and disposed in said accumulator, open at a lower end and connected to a fuel line having a hollow interior at an upper end.

4. The method of claim 3, wherein the step of delivering a slowly changing composition of fuel includes:

pumping fuel through said fuel line connected at one end to said tube and at a second end to a fuel rail, said fuel rail being in communication with a plurality of fuel injectors.

5. The method of claim 1, wherein the step of adjusting the amount of fuel supplied to said fuel injectors includes:

checking whether an oxygen factor is outside a coarse predetermined range;

turning the purge solenoid off, if said oxygen factor is outside a coarse range, otherwise control is returned to the ECU;

waiting a preset period of time;

checking whether said oxygen factor is within a fine predetermined range;

updating a purge multiplier, if said oxygen factor is within said fine range;

updating a fuel composition multiplier, if said oxygen factor is outside said fine range; and returning control to the ECU otherwise.

6. The method of claim 5, wherein the step of updating purge includes:

turning said purge solenoid on;

waiting another preset period of time;

updating a purge multiplier;

checking whether said oxygen factor is within a fine range; and updating said purge multiplier until said oxygen factor is within said fine range.

7. The method of claim 6, wherein the step of updating said fuel composition multiplier includes:

updating said fuel composition multiplier;

checking if said oxygen factor is within said fine range;

updating said fuel composition multiplier until said fuel composition multiplier is within said fine range; and turning said purge solenoid on.

8. The method of claim 7, further comprising the step of:

starting a timer.

9. The method of claim 7, further comprising the step of:

storing a fuel composition multiplier value, adaptive memory value and purge multiplier value in non-erasable memory in the ECU.

10. In a motor vehicle having an internal combustion engine with a throttle means; a fuel control system comprising a fuel tank for holding a fuel that may be gasoline or an alcohol, a fuel accumulator disposed within the fuel tank for receiving and storing fuel from the fuel tank, a fuel rail and fuel injectors; the fuel control system working in conjunction with an engine control unit (ECU) including a non-erasable memory, microprocessing unit, an input/output (I/O) module and an adaptive memory feature; evaporative emission controls (purge system) including a purge solenoid; an oxygen sensor having an input and an output; and an exhaust means for removal of engine exhaust; a method for determining a value of percent alcohol content of a fuel for selectively controlling combustion parameters of an internal combustion engine, the method comprising:

monitoring the amount of oxygen in the engine exhaust and making adjustments to the amount of fuel delivered to the engine to maintain stoichiometric engine operation;

drawing fuel from within a tank through a fuel pickup in communication with a fuel pump, and pumping pressurized fuel out of said fuel pump through a first line having a hollow interior connected between said fuel pump and a fuel pressure regulator;

checking pressure of said fuel with said fuel pressure regulator and draining said fuel through a fuel return line having a hollow interior and connected to said fuel pressure regulator at a first end and open at a second end, if the pressure exceeds a reference pressure;

flowing fuel therethrough a second line having a hollow interior disposed between said fuel pressure regulator at one end and the fuel accumulator at a second end;

depositing fuel through said second line into an upper section of said fuel accumulator;

withdrawing fuel from a lower section of said fuel accumulator through a tube having a hollow interior and disposed in said accumulator, open at a lower end and connected to a fuel line having a hollow interior at an upper end;

pumping fuel therethrough said fuel line connected at one end to said tube and at a second end to a fuel rail, said fuel rail being in communication with a plurality of fuel injectors.

11. The method of claim 10, wherein the step of monitoring the oxygen sensor includes:

checking whether an oxygen factor is outside a coarse predetermined range;

returning control to the ECU if said oxygen factor is within a coarse range;

turning the purge solenoid off, waiting a preset period of time, and checking whether said oxygen factor is within a fine predetermined range, if said oxygen factor is outside a coarse range;

turning said purge solenoid on, waiting another preset period of time, updating a purge multiplier, rechecking whether said oxygen factor is still within said fine range, updating said purge multiplier until said oxygen factor is within said fine range if said oxygen factor has drifted from said fine range, if said oxygen factor is within a fine range;

updating said fuel composition multiplier, checking if said oxygen factor is now within said fine range; and updating a fuel composition multiplier until said oxygen factor is within said fine range, turning said purge solenoid on and starting a timer, if said oxygen factor is outside a fine range;

storing fuel composition multiplier, adaptive memory and purge multiplier values in the non-erasable memory area of the ECU; and returning control to the ECU.

12. In a motor vehicle having an internal combustion engine with a throttle means; a fuel control system comprising a fuel tank for holding a fuel that may be gasoline or an alcohol, fuel rail and fuel injectors; the fuel control system working in conjunction with an engine control unit (ECU) including a non-erasable memory, microprocessing unit, an input/output (I/O) module and an adaptive memory feature; evaporative emission controls (purge system) including a purge solenoid; an oxygen sensor having an input and an output; an apparatus for determining a value of percent alcohol content of a fuel for selectively controlling combustion parameters of an internal combustion engine comprising:

a tank for holding fuel;

an accumulator disposed within said tank;

a means for injecting fuel into an engine;

a means within said tank for pumping said fuel to said accumulator for temporarily storing said fuel in a mixed state; and a fuel line connected at one end to said accumulator and at an opposite end to said means for injecting fuel into an engine.

13. The apparatus of claim 12, wherein said means for injecting fuel into an engine includes:

a fuel rail connected to at least one fuel injector.

14. The apparatus of claim 13, wherein said means for pumping fuel includes:

a fuel pump;

a fuel intake in communication with said fuel pump;

a pressure regulator having an outlet for draining-off excess fuel; and a line having a hollow interior connected at one end to said fuel pump and at a second end to said pressure regulator.

15. The apparatus of claim 14, wherein said means for temporarily storing said fuel includes:

an enclosed container for holding fuel;

a means for maintaining said fuel in said container in a mixed state;

a line having a hollow interior connected at one end to said pressure regulator and at a second end to said container for flow of said fuel into said container.

* * * * *